United States Patent
Boroschewski et al.

[11] 3,904,669
[45] Sept. 9, 1975

[54] N-ACYL BISCARBAMATE HERBICIDES
[75] Inventors: Gerhard Boroschewski, Berlin; Friedrich Arndt, Aich, both of Germany
[73] Assignee: Schering Aktiengesellschaft, Berlin, Germany
[22] Filed: Feb. 11, 1972
[21] Appl. No.: 225,626

[30] Foreign Application Priority Data
Feb. 16, 1971 Germany.............................. 2108975

[52] U.S. Cl..................... 260/471 C; 71/88; 71/94; 71/95; 71/100; 71/101; 71/111; 260/247.1; 260/247.2 B; 260/293.74; 260/326.83; 260/326.85; 260/455 A; 260/470
[51] Int. Cl.²........................................ C07C 125/06
[58] Field of Search ................... 260/471 C

[56] References Cited
UNITED STATES PATENTS
3,546,343  12/1970  Payne, Jr. et al. .............. 260/471 C

*Primary Examiner*—Anton H. Sutto
*Assistant Examiner*—L. A. Thaxton
*Attorney, Agent, or Firm*—Joseph F. Padlon

[57] ABSTRACT
Biscarbamates of the formula

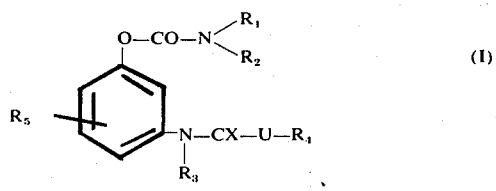

are selective herbicides harmless to many crop plants at dosage rates which kill many common weeds, and wherein $R_1$ is hydrogen, alkanoyl, alkyl, cycloalkyl, or a substitution product of said alkyl, alkanoyl, alkyl, or cycloalkyl;

$R_2$ is hydrogen, alkyl, alkenyl, cycloalkyl, aryl or a substitution product of said alkyl, alkenyl, cycloalkyl, or aryl; or $R_1$ and $R_2$ are connected by the nitrogen atom to form a heterocyclic ring which may contain one or more additional nitrogen and/or oxygen atoms;

$R_3$ is hydrogen, alkyl, alkanoyl, or substituted alkanoyl, at least one of $R_1$ and $R_3$ being the acyl radical of an acid;

$R_4$ is alkyl or a substitution product thereof;

$R_5$ is hydrogen, alkyl, or halogen;

X and Y are oxygen or sulfur, and are different or identical. The biscarbamates of formula (I) are most effective in synergistic mixtures with biscarbamates of the formula

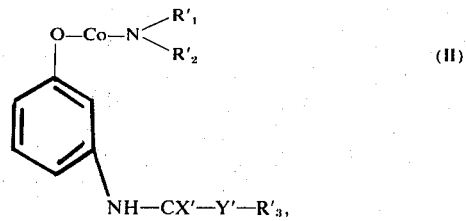

wherein $R'_1$ is hydrogen or alkyl;

$R'_2$ is the radical of an aliphatic, cycloaliphatic, or aromatic hydrocarbon which may carry one or more substituents; or $R'_1$ and $R'_2$ are connected by the nitrogen atom to form a heterocyclic ring which may contain one or more additional nitrogen and/or oxygen atoms;

$R'_3$ is alkyl, preferably methyl or ethyl, which may further be substituted; and $X'$ and $Y'$ are oxygen or sulfur, and are different or identical.

41 Claims, No Drawings

N-ACYL BISCARBAMATE HERBICIDES

This invention relates to novel herbicidal compounds and compositions, and to their use, and more specifically to derivatives of phenylcarbamate.

Certain substituted phenylcarbamates are known to have herbicidal effects. One of the best known and most commonly employed compounds of this class is N-(3-chlorophenyl)-isopropyl carbamate, (CIPC). Certain biscarbamates also have found acceptance, such as methyl-N-(3-N'-3'-methylphenyl-carbamoyloxy-phenyl)-carbamate as disclosed in German published patent application No. 1,567,151.

The primary object of the present invention is the provision of herbicides which are superior to the known compounds of similar structure in their good herbicidal effects on weeds while selectively sparing crop plants. Such compounds have now been found in the biscarbamates of the formula

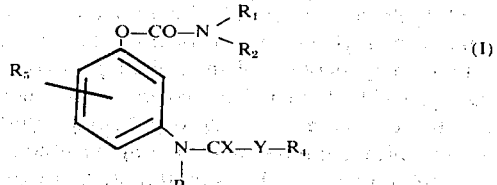

wherein
- $R_1$ is hydrogen, alkanoyl, alkyl, cycloalkyl, or a substitution product of said alkyl, akanoyl, alkyl, or cycloalkyl;
- $R_2$ is hydrogen, alkyl, alkenyl, cycloalkyl, aryl or a substitution product of said alkyl, alkenyl, cycloalkyl or aryl; or
- $R_1$ and $R_2$ are connected by the nitrogen atom to form a heterocyclic ring which may contain one or more additional nitrogen and/or oxygen atoms;
- $R_3$ is hydrogen, alkyl, alkanoyl, or substituted alkanoyl, at least one of $R_1$ and $R_3$ being the acyl radical of an acid;
- $R_4$ is alkyl or a substitution product thereof;
- $R_5$ is hydrogen, alkyl, or halogen;
- X and Y are oxygen and sulfur, and are different or identical.

The invention also relates to herbicidal compositions containing at least one compound of the above formula in effective amounts, and to the herbicidal use of the compounds and the compositions.

The compounds in which only one of $R_1$, $R_3$ is acyl have been found most effective, and superior results in the destruction of weeds among beta beets and umbelliferous crop plants have particularly been achieved with methyl and ethyl N-[3-(N'-acetyl-N'-phenylcarbamoyloxy)-phenyl]-carbamate and the derivatives thereof in which the N'-phenyl radical is substituted with alkyl, halogen, haloalkyl, or alkoxy.

The numerous compounds encompassed by the above formula include herbicides effective in pre-emergence as well as post-emergence treatment of weeds. The weeds successfully controlled by means of the compounds of the invention include Stellaria media, Senecio vulgaris, Matricaria chamomilla, Lamium amplexicaule, Galinsoga parviflora, Chenopodium album, Amarantus retroflexus, Setaria italica, and others, while being well tolerated by crop plants such as beta beets, cotton, peanuts, rice, corn, grain cereals, carrots, and other vegetables. Weeds may thus be controlled effectively among the crop plants without damage to the latter at application rates of about 0.5 to 5 kg of the active compound per hectare. If all weeds are to be destroyed without consideration of effects on crops the preferred application rate is at least 10 kg active compound per hectare.

The compounds of the invention may be applied jointly with other plant protecting and parasite controlling agents such as fungicides, nematocides, and the like, and they may be admixed to fertilizers. If some loss in selectivity can be tolerated, other herbicides may be admixed to the compounds of the invention to broaden the spectrum of weed killing effects.

Suitable other herbicides are found among the esters of carbamic acids and thiocarbamic acids, the substitution products of aniline and anilides, triazines, aminotriazoles, diazines such as 1-phenyl-4-amino-5-chloropyridazone-6, uraciles such as 3-cyclohexyl-5,6-trimethylene-uracil, aliphatic and halogenated carboxylic acids, halogenation products of benzoic and phenylacetic acid, aryloxycarboxylic acids, hydrazides, amides, nitriles, halogenated carboxylic acids such as 2,2-dichloropropionic acid and their salts, tetrafluoropropionic acids, esters of such carboxylic acids, ureas, 2,3,6-trichlorobenzyloxy-propanol, rhodane bearing agents, and the like.

Wetting agents, emulsifiers, solvents, oily adjuvants and the like may be combined with the compounds of the invention because of their synergistic effect with herbicides although they may not be phytotoxic in themselves.

The effectiveness of the afore-described compounds of the invention are enhanced particularly be the simultaneous application of compounds of the formula

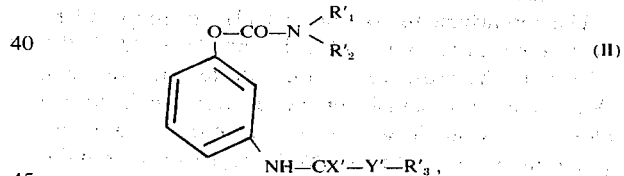

wherein
- $R'_1$ is hydrogen or alkyl;
- $R'_2$ is the radical of an aliphatic, cycloaliphatic, or aromatic hydrocarbon which may carry one or more substituents; or
- $R'_1$ and $R'_2$ are connected by the nitrogen atom to form a heterocyclic ring which may contain one or more additional nitrogen and/or oxygen atoms;
- $R'_3$ is alkyl, preferably methyl or ethyl, which may further be substituted; and
- X' and Y' are oxygen or sulfur, and are different or identical.

The herbicidal effect of the mixtures is greater than the combined effects of the ingredients so that the application rate may be reduced by as much as 25%.

The ratio of the two components in the mixture may vary within wide limits, and the optimum ratio depends on the effect that it is desired to achieve, on the kind and development stage of the weeds, climatic and weather conditions, and the method of application. It is thus not possible to set generally applicable limits of mixing ratios, and the mixing ratio is only one of the factors which determine the success of the herbicide application. Some experimentation is unavoidable for determining the optimum mixing ratio for a specific application.

Generally, the mixtures should contain the two components in ratios between 20:1 and 1:20, and the best results are most often achieved with mixtures within the limits of 10:1 and 1:10, all ratios being by weight.

The compounds of the invention are combined with inert ingredients to form compositions which may be powders and other solid, finely particulate mixtures, granulates, solutions, emulsions or suspensions containing liquid and/or solid carriers or diluents, and auxiliary agents such as wetting agents, adhesion enhancing agents, emulsifiers, and/or dispersing agents.

Suitable liquid carriers include water, aliphatic and aromatic hydrocarbons, such as benzene, toluene, cyclohexanone, isophoron, and various petroleum fractions. Suitable solid carriers include mineral matter, such as silica gel, talcum, kaolin, attaclay, limestone, silica, as well as vegetal matter such as various flours.

Surfactants employed successfully include calcium ligninesulfonate, polyoxyethylene octylphenol ether, naphthalenesulfonic acids, phenolsulfonic acids, formaldehyde condensation products, fat alcohol sulfates, and the alkali metal and alkaline earth metal salts of fatty acids.

The proportion of the active agent or agents in the compositions may be varied within wide limits. Effective compositions may contain, for example, 20 to 80% (by weight) active agent, the remainder being inert carriers or up to 20% surfactants.

The compositions of the invention are applied in the usual manner. When water is the carrier, the compositions are preferably formulated for application at a rate of 100 to 1,000 liters per hectare, and higher application rates may be chosen for total destruction of weeds.

The biscarbamates of formula (I) are prepared by heating biscarbamates with acid anhydrides at 140° – 150° C in the presence of concentrated sulfuric acid. When the biscarbamate employed has two hydrogen atoms in its amide groups, diacyl-biscarbamates are generally obtained. Monoacyl-derivatives still containing one hydrogen atom bound to amide nitrogen are obtained, for example, by acylating a 3-nitrophenyl-N-alkyl- or N-arylcarbamate hydrogenating the nitro group to the amino group in the presence of a catalyst, and reacting the product with an alkyl ester of chloroformic acid, chlorothioformic acid, or chlorodithioformic acid.

The compounds of the formula (I) may thus be prepared from compounds of the formula $R_2$—NH—CO—O—$C_6H_3(R_5)$—NH—CX—Y—$R_4$ by reaction with acid anhydrides of the formulas $R_6$—CO—O—CO—$R_6$ or OCH—O—CO—$CH_3$ in the presence of concentrated sulfuric acid at temperatures of about 140°– 150° C, $R_6$ being the radical of an aliphatic or cycloaliphatic hydrocarbon which may carry one or more substituents.

Alternatively, compounds of the formula $R_7N(R_2)$—CO—O—$C_6H_3(R_5)$—NH—CX—Y—$R_4$ may be reacted with the aforementioned acid anhydrides, $R_7$ being the radical of an aliphatic or cycloaliphatic hydrocarbon which may carry one or more substituents, or $R_7$ and $R_2$ jointly with the connecting nitrogen atom forming a heterocyclic ring which may contain one or more additional nitrogen and/or oxygen atoms, $R_1$ to $R_5$, X, and Y being otherwise as defined above.

When only $R_1$ is acyl or substituted acyl, the compounds of formula (I) may be prepared by reacting compounds of the formula $R_2$—NH—CO—O—$C_6H_3(R_5)$—N($R_3$)—CX—Y—$R_4$ with acid anhydrides of the type described above.

It is also possible to hydrogenate a compound of the formula $R_2$—N($R_8$)—CO—O—$C_6H_3(R_5)$—$NO_2$ to the corresponding amine in the presence of a catalyst, and by further reacting the amine with a compound of the formula $R_4$—Y—CX—CL, that is, with an ester of chloroformic chlorothioformic, or chlorodithioformic acid to produce the desired herbicidal compound, $R_8$ being the acyl radical of a carboxylic acid or hydrogen, when $R_2$ contains a tertiary carbon atom in position 1.

More specifically, $R_1$ in Formula (I) is preferably hydrogen, the acyl radical of a carboxylic acid having up to six carbon atoms which may carry a halogen substituent, or alkyl having up to five carbon atoms. $R_2$ is preferably hydrogen, alkyl having up to eight carbon atoms, allyl, cycloalkyl having 5 to 7 carbon atoms which may carry a methyl substituent, phenyl, alkylphenyl, halophenyl, alkylmercaptophenyl, dihalophenyl, dimethylphenyl, alkylhalophenyl, alkoxyphenyl, or haloalkyl. $R_1$ and $R_2$ also may form a heterocyclic ring with the connecting nitrogen atom, and the ring may include additional hetero atoms. $R_3$ is preferably hydrogen or the acyl radical of a carboxylic acid having up to 6 carbon atoms which may carry a halogen substituent. $R_4$ is preferably alkyl having up to three carbon atoms, and $R_5$ is preferably hydrogen.

Thus, $R_1$ and $R_3$ may be hydrogen, methyl, ethyl, n-propyl, isopropyl, acetyl, chloracetyl, dichloracetyl, trichloracetyl, bromacetyl, fluoracetyl, trifluoracetyl, propionyl, butyryl, isobutyryl, capryl, acryl, 2-chloro- or 3-chloropropionyl, 2-bromo- or 3-bromopropionyl, trimethylacetyl, iodacetyl, methoxyacetyl, ethoxyacetyl, 2-chloro- or 4-chlorobutyryl, 2-bromo- or 4-bromobutyryl, or formyl.

$R_2$ may be phenyl, 2-methylphenyl, 3-methylphenyl, 4-methylphenyl, 2,4-, 3,5-, 3,4-, 2,5-, 2,6-dimethylphenyl; 2-chloro-,3-chloro-, 2,4-, 3,5-, 3,4-, 2,5-, 2,6-dichlorophenyl; 2-bromo-, 3-bromo-, 4-bromophenyl; 2-, 3-, or 4-iodophenyl; 2-, 3-, or 4-methoxyphenyl; 2-, 3-, 4-methylmercaptophenyl; 3-trifluoromethylphenyl; 2-, 3-, or 4-fluorophenyl; 4-ethylphenyl, 2-methyl-4-chlorophenyl, methyl, ethyl, n-propyl, isopropyl, n-butyl, isobutyl, sec. butyl, tert-butyl, pentyl-(1), -(2), or -(3), 2-methylbutyl, 3-methylbutyl, neopentyl, hexyl, allyl, 2,3-dimethylbutyl, cyclohexyl, 2-, 3-, or 4-methylcyclohexyl, heptyl, octyl, 2,2,4,4-tetramethylbutyl, norbornyl, cyclodecyl, or adamantyl.

$R_4$ may be methyl or ethyl.

$R_5$ may be hydrogen, methyl or chlorine.

$R_1$ and $R_2$ jointly with the nitrogen atom may be pyrrolidino, piperidino- or morpholino.

The following Examples illustrate the preparation of compounds of formula (I).

EXAMPLE 1

Methyl-N-acetyl-N-[3-(N'acetyl-N'-n-butylcarbamoyloxy)-phenyl]-carbamate 26.6 g (0.1 Mol) methyl-N-[3-(N'-n-butylcarbamoyloxy)-phenyl]-carbamate was dissolved in 100 ml acetic anhydride containing 1 ml concentrated sulfuric acid, and the solution was refluxed for 30 minutes. It was then permitted to cool to 80° C whereupon 4 g sodium acetate was added, and the mixture was evaporated in a vacuum. The residue was dissolved in a mixture of chloroform and methylene chloride, and the solution was kept cool by addition of ice while it was washed sequentially with water, dilute sodium hydroxide solution, and dilute sodium chloride solution until neutral. It was then dried with desiccated magnesium sulfate and evaporated in a vacuum. A major portion of the residue dissolved in 400 ml isopropyl ether. The solution was heated to a boil in the presence of active carbon, then cooled to room temperature and filtered. The filtrate was evaporated to dryness.

The desired product was obtained in an amount of 24.2 g (69% yield). $n_D^{20} = 1.5119$.

EXAMPLE 2

Methyl-N-[3-(N'-acetyl-N'-n-butylcarbamoyloxy)-phenyl]-carbamate 20 g (0.08 Mol) 3-aminophenyl-N-acetyl-N-n-butylcarbamate was dissolved in about 100 ml ethyl acetate, and the solution was dissolved in about 100 ml ethyl acetate, and the solution was mixed with 20 ml water. 2 g (0.05 Mol) magnesium oxide was added, and the mixture was stirred and cooled to 10° C while 9.4 g methyl chloroformate was added dropwise. Stirring was continued thereafter for 45 minutes at ambient temperature, and the mixture was acidified with dilute hydrochloric acid in the presence of ice. The organic phase was recovered, washed with water, dried with desiccated magnesium sulfate, and partly evaporated in a vacuum. The desired compound crystallized from its solution in isopropyl ehter.

Yield: 15.4 g (63%). M.P. 84°–86° C.

Other compounds of formula (I) prepared n an analogous manner are listed below together with their characteristic physical properties.

Table I

| Compound | | Value |
|---|---|---|
| Methyl-N-acetyl-N-[3-(N'-acetyl-N'-ethylcarbamoyloxy)-phenyl]-carbamate | M.P.: | 83 – 84°C |
| Methyl-N-acetyl-N-[3-(N'-acetyl-N'-n-propylcarbamoyloxy)-phenyl]-carbamate | M.P.: | 76 – 78°C |
| Methyl-N-acetyl-N-[3-(N'-acetyl-N'-isopropylcarbamoyloxy)-phenyl]-carbamate | $n_D^{20}$ | 1.5216 |
| Methyl-N-acetyl-N-[3-(N'-acetyl-N-'-n-butylcarbamoyloxy)-phenyl]-carbamate | $n_D^{20}$ | 1.5119 |
| S-Methyl-N-acetyl-N-[3-(N'-acetyl-N'-n-butylcarbamoyloxy)-phenyl]-thiocarbamate | $n_D^{20}$ | 1.4906 |
| S-Methyl-N-acetyl-N-[3-(N'-acetyl-N'-isobutylcarbamoyloxy)-phenyl]-thiocarbamate | $n_D^{20}$ | 1.5125 |
| S-Methyl-N-acetyl-N-[3-(N'-acetyl-N'-sec.-butylcarbamoyloxy)-phenyl]-thiocarbamate | $n_D^{20}$ | 1.5135 |
| S-Methyl-N-acetyl-N-[3-(N'-acetyl-N'-neopentylcarbamoyloxy)-phenyl]-thiocarbamate | $n_D^{20}$ | 1.5099 |
| S-Methyl-N-acetyl-N-[3-(N'-acetyl-N'-allylcarbamoyloxy)-phenyl]-thiocarbamate | $n_D^{20}$ | 1.5230 |
| Methyl-N-propionyl-N-[3-(N'-methyl-N'-propionylcarbamoyloxy)-phenyl]-carbamate | $n_D^{20}$ | 1.4984 |
| Methyl-N-propionyl-N-[3-(N'-ethyl-N'-propionylcarbamoyloxy(-phenyl]-carbamate | $n_D^{20}$ | 1.5270 |
| Methyl-N-propionyl-N-[3-(N'-n-butyl-N'-propionylcarbamoyloxy)-phenyl]-carbamate | $n_D^{20}$ | 1.5109 |
| Methyl-N-propionyl-N-[3-(N'-isobutyl-N'-propionylcarbamoyloxy)-phenyl]-carbamate | $n_D^{20}$ | 1.5000 |
| Methyl-N-propionyl-N-[3-(N'-sec.butyl-N'-propionylcarbamoyloxy)-phenyl]-carbamate | $n_D^{20}$ | 1.4864 |
| Methyl-N-propionyl-N-[3-(N'-neopentyl-N'-propionylcarbamoyloxy)-phenyl]-carbamate | $n_D^{20}$ | 1.4918 |
| Methyl-N-propionyl-N-[3-(N'-(3'-methylbutyl)-N'-propionylcarbamoyloxy)-phenyl]-carbamate | $n_D^{20}$ | 1.5013 |
| Methyl-N-propionyl-N-[3-(N'-cyclohexyl-N'-propionylcarbamoyloxy)-phenyl]-carbamate | $n_D^{20}$ | 1.5534 |
| Methyl-N-butyryl-N-[3-N'-methyl-N'-butyrylcarbamoyloxy)-phenyl]-carbamate | $n_D^{20}$ | 1.5151 |
| Methyl-N-butyryl-N-[3-(N'-ethyl-N'-butyrylcarbamoylosy)-phenyl]-carbamate | $n_D^{20}$ | 1.5079 |
| Methyl-N-butyryl-N-[3-(N'-propyl-N'-butyrylcarbamoyloxy)-phenyl]-carbamate | $n_D^{20}$ | 1.4940 |
| Methyl-N-butyryl-N-[3-(N'-n-butyl-N'-butyrylcarbamoyloxy)-phenyl]-carbamate | $n_D^{20}$ | 1.5071 |
| Methyl-N-butyryl-N-[3-(N'-isobutyl-N'-butyrylcarbamoyloxy)-phenyl]-carbamate | $n_D^{20}$ | 1.5041 |
| 3,Methyl-N-butyryl-N-[3-(N'-neopentyl-N'-butyrylcarbamoyloxy)-phenyl]-carbamate | $n_D^{20}$ | 1.5008 |
| Methyl-N-butyryl-N-[3-(N'-cyclohexyl-N'-butyrylcarbamoyloxy)-phenyl]-carbamate | $n_D^{20}$ | 1.4912 |
| Methyl-N-isobutyryl-N-[3-(N'-methyl-N'-isobutyrylcarbamoyloxy)-phenyl]-carbamate | | resinous |
| Methyl-N-isobutyryl-N-[3-N'-ethyl-N'-isobutyrylcarbamoyloxy)-phenyl]-carbamate | $n_D^{20}$ | 1.4920 |
| Methyl-N-isobutyryl-N-[3-(N'-propyl-N'-isobutyrylcarbamoyloxy)-phenyl]-carbamate | $n_D^{20}$ | 1.4886 |
| Methyl-N-isobutyryl-N-[3-(N'-butyl-N'-isobutyrylcarbamoyloxy)-phenyl]-carbamate | $n_D^{20}$ | 1.5041 |
| Methyl-N-isobutyryl-N-[3-(N'-neopentyl-N'-isobutyrylcarbamoyloxy)-phenyl]-carbamate | $n_D^{20}$ | 1.4918 |
| Methyl-N-isobutyryl-N-[3-(N'-allyl-N'-isobutyrylcarbamoyloxy)-phenyl]-carbamate | $n_D^{20}$ | 1.5232 |
| Methyl-N-capryl-N-[3-(N'-methyl-N'caprylcarbamoyloxy)-phenyl]-carbamate | $n_D^{20}$ | 1.5135 |
| Methyl-N-bromacetyl-N-[3-(N'-n-butyl-N'-bromacetylcarbamoyloxy)-phenyl]-carbamate | | resinous |
| Methyl-N-acetyl-N-[3-(N'-phenyl-N'-acetylcarbamoyloxy)-phenyl]-carbamate | $n_D^{20}$ | 1.5390 |
| Methyl-N-acetyl-N-[3-(N'-3'-methylphenyl-N'-acetylcarbamoyloxy)-phenyl]-carbamate | | resinous |
| Ethyl-N-acetyl-N-[3-(N'-3'-methylphenyl-N'-acetylcarbamoyloxy)-phenyl]-carbamate | $n_D^{20}$ | 1.5350 |
| Methyl-N-acetyl-N-[3-(N',N'-diethylcarbamoyloxy)-phenyl]-carbamate | $n_D^{20}$ | 1.5179 |
| Methyl-N-acetyl-N-[3-(N'-tert-butylcarbamoyloxy)-phenyl]-carbamate | $n_D^{20}$ | 1.5237 |
| Methyl-N-acetyl-N-[3-(N'-methyl-N'-phenylcarbamoyloxy)-phenyl]-carbamate | | resinous |
| Methyl-N-[3-(N'-acetyl-N'-n-butylcarbamoyloxy)-phenyl]-carbamate | M.P.: | 84 – 86°C |
| Methyl-N-acetyl-N-[3-(N'-acetyl-N'-(2'-methylphenyl)-carbamoyloxy)-phenyl] carbamate | $n_D^{20}$ | 1.5525 |
| Methyl-N-propionyl-N-[3-(N'-propionyl-N'-(4'-methylphenyl)-carbamoyloxy)-phenyl]-carbamate | $n_D^{20}$ | 1.5505 |
| Methyl-N-propionyl-N-[3-(N'-propionyl-N'-(3'-chlorophenyl)-carbamoyloxy)-phenyl]-carbamate | $n_D^{20}$ | 1.5545 |
| Methyl-N-[3-N'-acetyl-N'-phenylcarbamoyloxy)-phenyl]-carbamate | M.P.: | 124 – 125°C |
| Methyl-N-[3-(N'-acetyl-N'-3'-methylphenyl-carbamoyloxy)-phenyl]-carbamate | $n_D^{20}$ | 1.5415 |
| S-Methyl-N-[3-(N'-acetyl-N'-phenylcarbamoyloxy)-phenyl]-thiocarbamate | $n_D^{20}$ | 1.5710 |
| S-Methyl-N-[3-(N'-acetyl-N'-3'-methylphenyl-carbamoyloxy)-phenyl]-thiocarbamate | $n_D^{20}$ | 1.5800 |
| Methyl-N-acetyl-N-[3-(N'-acetyl-N'-3'-chlorophenyl-carbamoyloxy)-phenyl]-carbamate | M.P.: | 125°C |
| Methyl-N-acetyl-N-[3-(N'-acetyl-N'-4'-methylphenyl-carbamoyloxy)-phenyl]-carbamate | M.P.: | 127°C |
| Methyl-N-acetyl-N-[3-(N'-acetyl-N'-2'-phenylethyl-carbamoyloxy)-phenyl]-carbamate | M.P.: | 110 – 111°C |
| S-Methyl-N-[3-ON'-acetyl-N'-n-butylcarbamoyloxy)-phenyl]-thiocarbamate | M.P.: | 65 – 68°C |
| O-Methyl-N-acetyl-N-[3-(N'-acetyl-N'-3'-methylphenyl-carbamoyloxy)-phenyl]-thiocarbamate | $n_D^{20}$ | 1.5645 |
| Methyl-N-isobutyryl-N-[3-(N'-isobutyryl-N'-n-butylcarbamoyloxy)-phenyl]-carbamate | $n_D^{20}$ | 1.5155 |

Table I – Continued

| | | |
|---|---|---|
| Methyl-N-propionyl-N-[3-(N'-propionly-N'-(2'-methylphenyl)-carbamoyloxy)-phenyl]-carbamate | $n_D^{20}$ | 1.5430 |
| Methyl-N-acetyl-N-[3-(N'-acetyl-N'-(3'-Methylbutyl)-carbamoyloxy)-phenyl]-carbamate | M.P.: | 70.5 – 71°C |
| Methyl-N-isobutyryl-N-[3-(N'-isobutyryl-N'-(4'-methylphenyl)-carbamoyloxy)-phenyl]-carbamate | $n_D^{20}$ | 1.5382 |
| Methyl-N-acetyl-N-[3-(N'-acetyl-N'-(2'-phenylethyl)-carbamoyloxy)-phenyl]-carbamate | M.P.: | 110 – 111°C |
| Methyl-N-acetyl-N-[3-(N'-acetyl-N'-methylcarbamoyloxy)-phenyl]-carbamate | $n_D^{20}$ | 1.5148 |
| Methyl-N-butyryl-N-[3-(N'-butyryl-N'-sec.butylcarbamoyloxy)-phenyl]-carbamate | $n_D^{20}$ | 1.4468 |
| Methyl-N-propionyl-N-[3-(n'-propionyl-N'-allylcarbamoyloxy)-phenyl]-carbamate | resinous | |
| Methyl-N-acetyl-N-[3-(N'-acetyl-N'-cyclohexylcarbamoyloxy)-phenyl]-carbamate | resinous | |
| Methyl-N-acetyl-N-[3-(N'-acetyl-N'-4'-methylpentyl-2-carbamoyloxy-phenyl]-carbamate | $n_D^{20}$ | 1.5060 |
| Methyl-N-acetyl-N-[3-N'-acetyl-N'-2'-methylvutyl-carbamoyloxy)-phenyl]-carbamate | $n_D^{20}$ | 1.6060 |
| Methyl-N-[3-(N'-acetyl-N'-n-propylcarbamoyloxy)-phenyl]-carbamate | $n_D^{20}$ | 1.5115 |
| Methyl-N-[3-(N'-acetyl-N'-allylcarbamoyloxy)-phenyl]-carbamate | $n_D^{20}$ | 1.5380 |
| Methyl-N-[3-(N'-acetyl-N'-neopentylcarbamoyloxy)-phenyl]-carbamate | $n_D^{20}$ | 1.5212 |
| Methyl-N-[3-(N'-acetyl-N'-4'-methylpentyl-2'-carbamoyloxy)-phenyl]-carbamate | $n_D^{20}$ | 1.5080 |
| Methyl-N-[3-(N'-acetyl-N'-pentylcarbamoyloxy)-phenyl]-carbamate | $n_D^{20}$ | 1.5201 |
| Methyl-N-[3-(N'-acetyl-N'-2'-methylbutyl-carbamoyloxy)-phenyl]-carbamate | $n_D^{20}$ | 1.5219 |
| Methyl-N-[3-(N'-propionyl-N'-n-propylcabamoyloxy)-phenyl]-carbamate | $n_D^{20}$ | 1.5090 |
| Methyl-N-α-bromopropionyl-N-[3-(N'-α-bromopropionyl-N'-n-butylcarbamoyloxy)-phenyl]-carbamate | $n_D^{20}$ | 1.5225 |

Most of the compounds are resins which dissolve quite well in most organic solvents, such as ethyl ether, isopropyl ether, cyclohexanone, isophoron, acetone, ethyl acetate, methylene chloride, and chloroform. They are insoluble in water.

The starting materials for preparing the compounds of formula (I) are either known, or they can be prepared by wellknown methods. The following EXamples illustrate the preparation of some starting materials.

EXAMPLE 3

3-Nitrophenyl-N-acetyl-N-n-butylcarbamate 25.8 (0.1 Mol) 3-nitrophenyl-N-n-butylcarbamate was reacted with 100 ml acetic anhydride and 1 ml concentrated sulfuric acid as in Example 1.
Yield: 23.9 g (85%). $n_D^{20}$ = 1.5278

In an analogous manner, there were prepared 3-nitrophenyl-N-acetyl-N-phenylcarbamate of M.P. 94° – 95°C and 3-nitrophenyl-N-acetyl-N-(3'-methylphenyl)-carbamate of M.P. 130° – 132° C.

EXAMPLE 4

3-Aminophenyl-N-acetyl-N-n-butylcarbamate 86 g (0.307 Mol) 3-nitrophenyl-N-acetyl-N-n-butylcarbamate was hydrogenated at ambient temperature in one liter methanol in the presence of 8 g Raney nickel. The hydrogenation mixture was filtered, and the filtrate was evaporated in a vacuum. The residue was dissolved in ethyl acetate, and extracted with dilute hydrochloric acid in the presence of ice. The aqueous phase was made alkaline with potassium carbonate solution, and the precipitated reaction product was dissolved in ethyl acetate. The solution so obtained was dried over magnesium sulfate and evaporated to dryness.

The resinous product weighed 43.4 g (57% yield).

In an analogous manner, there were prepared 3-aminophenyl-N-acetyl-N-phenylcarbamate of $n_D^{20}$ 1.5746, and 3-aminophenyl-N-acetyl-N-3'-methylphenyl-carbamate of $n_D^{20}$ 1.5750.

Herbicidal compounds of Formula II which enhance the effect of the compounds of Formula I are listed in Table II.

Table II

| | | |
|---|---|---|
| Methyl-N-[3-N'-3'-methylphenyl-carbamoyloxy)-phenyl]-carbamate | M.P. | 143 – 144°C |
| O-Methyl-N-[3-(N'-n-octylcarbamoyloxy)-phenyl]-thiocarbamate | | resinous |
| O-Methyl-N-[3-(N'-isopropylcarbamoyloxy)-phenyl]-thiocarbamate | M.P. | 123 – 126°C |
| O-Methyl-N-[3-(N'-n-butylcarbamoyloxy)-phenyl]-thiocarbamate | M.P. | 62 – 64°C |
| O-Methyl-N-[3-(N'-allylcarbamoyloxy)-phenyl]-thiocarbamate | M.P. | 71 – 72°C |
| O-Methyl-N-[3-(N'-3'-methoxyphenyl-carbamoyloxy)-phenyl]-thiocarbamate | M.P. | 93 – 95°C |
| O-Methyl-N-[3-(N'-diethylcarbamoyloxy)-phenyl]-thiocarbamate | $n_D^{20}$ | 1.5505 |
| O-Methyl-N-[3-(N'-neopentylcarbamoyloxy)-phenyl]-thiocarbamate | M.P. | 121 – 122°C |
| O-Methyl-N-[3-(N'-isobutylcarbamoyloxy)-phenyl]-thiocarbamate | M.P. | 103° |
| O-Methyl-N-[3-(N'-pentyl-2'-carbamoyloxy)-phenyl]-thiocarbamate | M.P. | 83 – 84.5°C |
| S-Ethyl-N-[3-(N'-n-butylcarbamoyloxy)-phenyl]-thiocarbamate | M.P. | 145°C |
| S-Ethyl-N-[3-(N'-allylcarbamoyloxy)-phenyl]-thiocarbamate | M.P. | 137 – 138°C |
| S-Ethyl-N-[3-(N'-ethylcarbamoyloxy)-phenyl]-thiocarbamate | M.P. | 148 – 149°C |
| S-Ethyl-N-[3-(N'-isopropylcarbamoyloxy)-phenyl]-thiocarbamate | M.P. | 170 – 171°C |
| S-Ethyl-N-[3-(N'-propylcarbamoyloxy)-phenyl]-thiocarbamate | M.P. | 157 – 158°C |
| S-Ethyl-N-[3-(N'-methylcarbamoyloxy)-phenyl]-thiocarbamate | M.P. | 139 – 141°C |
| S-Ethyl-N-[3-(N'-cyclohexylcarbamoyloxy)-phenyl]-thiocarbamate | M.P. | 163 – 164°C |
| S-Ethyl-N-[3-N'-isobutylcarbamoyloxy)-phenyl]-thiocarbamate | M.P. | 160 – 161°C |
| S-Ethyl-N-[3-(N',N'-dimethylcarbamoyloxy)-phenyl]-thiocarbamate | M.P. | 103 – 104°C |
| S-Ethyl-N-[3-N'-tert butylcarbamoyloxy)-phenyl]-thiocarbamate | M.P. | 164 – 165°C |
| S-Ethyl-N-[ 3-(N'-2'-ethylhexyl-carbamoyloxy)-phenyl]-thiocarbamate | $n_D^{20}$ | 1.5402 |

Table II – Continued

| Compound | | |
|---|---|---|
| S-Ethyl-N-[3-(N'-sec. butylcarbamoyloxy)-phenyl]-thiocarbamate | M.P. | 146 – 147°C |
| S-Methyl-N-[3-(N-tert-butylcarbamoyloxy)-phenyl]-thiocarbamate | M.P. | 153 – 155°C |
| S-Methyl-N-[3-(N'-ethylcarbamoyloxy)-phenyl]-thiocarbamate | M.P. | 149 – 150°C |
| S-Methyl-N-[3-(N'-isopropylcarbamoyloxy)-phenyl]-thiocarbamate | M.P. | 176 – 177°C |
| S-Methyl-N-[3-(N'-butylcarbamoyloxy)-phenyl]-thiocarbamate | M.P. | 141 – 143°C |
| S-Methyl-N-[3-(N'-dimethylcarbamoyloxy)-phenyl]-thiocarbamate | M.P. | 119 – 121°C |
| S-Methyl-N-[3-(N'-allylcarbamoyloxy)-phenyl]-thiocarbamate | M.P. | 164 – 166°C |
| S-Methyl-N-[3-(N'-isobutylcarbamoyloxy)-phenyl]-thiocarbamate | M.P. | 167 – 169°C |
| S-Methyl-N-[3-(N'-1',1',3',3'-tetramethylbutyl-carbamoyloxy)-phenyl]-thiocarbamate | M.P. | 137 – 138°C |
| S-Methyl-N-[3-(N'-neopentylcarbamoyloxy)-phenyl]-thiocarbamate | M.P. | 173 – 174°C |
| S-Methyl-N-[3-(N'-pentylcarbamoyloxy)-phenyl]-thiocarbamate | M.P. | 114 – 116°C |
| S-Methyl-N-[3-(N'-cyanomethyl-N'-methylcarbamoyloxy)-phenyl]-thiocarbamate | $n_D^{20}$ | 1.5714 |
| S-Methyl-N-[3-(N'-cyanomethyl-carbamoyloxy)-phenyl]-thiocarbamate | M.P. | 135 – 136°C |
| S-Methyl-N-[3-(N'-4'-methylpentyl-2'-carbamoyloxy)-phenyl]-thiocarbamate | M.P. | 132 – 133°C |
| S-Methyl-N-[3-(N'-3'-methylbutyl-2'-carbamoyloxy)-phenyl]-thiocarbamate | M.P. | 140 – 141°C |
| S-Methyl-N-[3-(N'-sec. butylcarbamoyloxy)-phenyl]-thiocarbamate | M.P. | 139 – 140°C |
| S-Methyl-N-[3-(N'-1'-chlorobutyl-2'-carbamoyloxy)-phenyl]-thiocarbamate | M.P. | 168 – 170°C |
| S-Methyl-N-[3-N'norbornyl-2'-carbamoyloxy)-phenyl]-thiocarbamate | M.P. | 205 – 206°C |
| S-Methyl-N-[3-(N'-morpholinocarbonyloxy)-phenyl]-thiocarbamate | M.P. | 114 – 116°C |
| S-Methyl-N-[3-(N'-piperidinocarbonyloxy)-phenyl]-thiocarbamate | M.P. | 108 – 110°C |
| S-Methyl-N-[3-(N'-2'-hydroxyethylcarbamoyloxy)-phenyl]-thiocarbamate | M.P. | 133 – 135°C |
| S-Methyl-N-[3-(N'-2'-cyanoethyl-N'-isopropylcarbamoyloxy)-phenyl]-thiocarbamate | M.P. | 138 – 139°C |
| S-Methyl-N-[3-N'-3'-methylbutyl-carbamoyloxy-phenyl]-thiocarbamate | M.P. | 116 – 118°C |
| S-Methyl-N-(3-carbamoyloxy-phenyl)-thiocarbamate | M.P. | 194 – 195°C |
| S-Methyl-N-[3-(N'-allylcarbamoyloxy)-phenyl]-thiocarbamate | M.P. | 164 – 166°C |
| S-Methyl-N-[3-(N'-n-butylcarbamoyloxy)-phenyl]-thiocarbamate | M.P. | 141 – 143°C |
| S-Methyl-N-[3-(N'-isobutylcarbamoyloxy)-phenyl]-thiocarbamate | M.P. | 167 – 169°C |
| S-Methyl-N-[3-(N'-neopentylcarbamoyloxy)-phenyl]-thiocarbamate | M.P. | 173 – 174°C |
| S-Methyl-N-[3-(N'-4'-methylpentyl-2'-carbaboyloxy)-phenyl]-thiocarbamate | M.P. | 136 – 137°C |
| S-Methyl-N-[3-(N'-norbornyl-2'-carbamoyloxy)-phenyl]-thiocarbamate | M.P. | 190 – 191°C |
| S-Methyl-N-[3-(N'-2'-methylcyclohexyl-carbamoyloxy)-phenyl]-thiocarbamate | M.P. | 146.5 – 148.5°C |
| Sec. butyl-N-[3-(N',N'-diethylcarbamoyloxy)-phenyl]-carbamate | M.P. | 62 – 63°C |
| Sec. butyl-N-[3-(N'-isopropylcarbamoyloxy)-phenyl]-carbamate | M.P. | 148 – 149°C |
| Sec. butyl-N-[3-(N'-tert butylcarbamoyloxy)-phenyl]-carbamate | M.P. | 136 – 137°C |
| Butin-(1)-yl-(3)-N-[3'-(N'-tert-butylcarbamoyloxy)-phenyl]-thiocarbamate | M.P. | 172 – 173°C |
| S-Methyl-N-[3'-(N'-2'-methylphenyl-carbamoyloxy)-phenyl]-thiocarbamate | M.P. | 164 – 166°C |
| Methyl-N-[3-(N'-3'-methoxyphenyl-carbamoyloxy)-phenyl]-carbamate | M.P. | 122 – 125°C |
| Methyl-N-[3-(N'-3',5'-dimethylphenyl-carbamoyloxy)-phenyl]-carbamate | M.P. | 157.5°C |
| Methyl-N-[3-(N'-methyl-N'-phenylcarbamoyloxy)-phenyl]-carbamate | M.P. | 124°C |
| S-Methyl-N-[3-(N'-tert-butylcarbamoyloxy)-phenyl]-thiocarbamate | M.P. | 137°C (decomp.) |
| S-Methyl-N-[3-(N'-methylcarbamoyloxy)-phenyl]-thiocarbamate | M.P. | 157°C |
| S-Methyl-N-[3-(N'-3'-chlorophenyl-carbamoyloxy)-phenyl]-thiocarbamate | M.P. | 146 – 148°C |
| S-Methyl-N-[3-(N'-3'-methylphenyl-carbamoyloxy)-phenyl]-thiocarbamate | M.P. | 152 – 154°C |
| S-Methyl-N-[3-(N'-3'-methoxyphenyl-carbamoyloxy)-phenyl]-thiocarbamate | M.P. | 153 – 156°C |
| S-Methyl-N-[3-(N'-3'-methylcyclohexyl-carbamoyloxy)-phenyl]-thiocarbamate | M.P. | 150 – 153°C |
| S-Methyl-N-[3-(N'-phenylcarbamoyloxy)-phenyl]-thiocarbamate | M.P. | 159 – 160°C |
| S-Methyl-N-[3-(N'-methyl-N'-phenylcarbamoyloxy)-phenyl]-thiocarbamate | M.P. | 101 – 102°C |
| S-Methyl-N-[3-(N'-ethylcarbamoyloxy)-phenyl]-thiocarbamate | M.P. | 153 – 155°C |
| S-Methyl-N-[3-(N'-propylcarbamoyloxy)-phenyl]-thiocarbamate | M.P. | 149 – 150°C |
| S-Methyl-N-[3-(N'-isopropylcarbamoyloxy)-phenyl]-thiocarbamate | M.P. | 176 – 177°C |
| S-Methyl-N-[3-(N',N'-dimethylcarbamoyloxy)-phenyl]-thiocarbamate | M.P. | 119 – 121°C |
| Methyl-N-[3-(N'-3'-methylphenyl-carbamoyloxy)-phenyl]-carbamate | M.P. | 139 – 142°C |
| Ethyl-N-[3-(N'-3'-methylphenyl-carbamoyloxy)-phenyl]-carbamate | M.P. | 128 – 129°C |
| Methyl-N-[3-(N'-phenylcarbamoyloxy)-phenyl]-carbamate | M.P. | 152°C |
| Ethyl-N-[3-(N'-phenylcarbamoyloxy)-phenyl]-carbamate | M.P. | 117 – 118°C |
| Methyl-N-[3-(N'-3'-chlorophenyl-carbamoyloxy)-phenyl]-carbamate | M.P. | 153 – 154°C |
| Ethyl-N-[3-(N'-3'-chlorophenyl-carbamoyloxy)-phenyl]-carbamate | M.P. | 127 – 128°C |
| Methyl-N-[3-(N'-4'-methylphenyl-carbamoyloxy)-phenyl]-carbamate | M.P. | 162 – 163.5°C |
| S-Methyl-N-[3-(N'-4'-methylphenyl-carbamoyloxy)-phenyl]-thiocarbamate | M.P. | 173 – 174°C |
| S-Methyl-N-[3-(N'-ethyl-N'-4'-methylphenyl-carbamoyloxy)-phenyl]-thiocarbamate | M.P. | 104 – 105°C |
| S-Methyl-N-[3-(N'-(2',4'-dimethoxy-5'-chlorophenyl)-carbamoyloxy)-phenyl]-thiocarbamate | M.P. | 143 – 146°C |
| S-Methyl-N-[3-(N'-3'-fluorophenyl-carbamoyloxy)-phenyl]-thiocarbamate | M.P. | 150 – 151°C |
| S-Ethyl-N-[3-(N'-4'-ethylphenyl-carbamoyloxy)-phenyl]-thiocarbamate | M.P. | 153 – 154°C |
| S-Methyl-N-[3-(N'-pentylcarbamoyloxy)-phenyl]-thiocarbamate | M.P. | 114 – 116°C |
| Methyl-N-[3-(N-1'-chlorobutyl-2'-carbamoyloxy)-phenyl]-carbamate | M.P. | 143 – 144°C |
| O-methyl-N-[3-(N'-4'-fluorophenyl-carbamoyloxy)-phenyl]-thiocarbamate | M.P. | 125 – 126°C |
| O-Methyl-N-(3-piperidinocarbonyloxyphenyl)-thiocarbamate | M.P. | 105 – 106°C |
| O-Methyl-N-(3-morpholinocarbonyloxyphenyl)-thiocarbamate | M.P. | 82 – 84°C |
| O-Methyl-N-(3-pyrrolidinocarbonyloxyphenyl)-thiocarbamate | M.P. | 97 – 99°C |
| O-Ethyl-N-[3-(N'-3'-methylphenyl-carbamoyloxy)-phenyl]-thiocarbamate | M.P. | 93 – 94°C |
| O-Ethyl-N-[3-(N'-methylphenyl-carbamoyloxy)-phenyl]-thiocarbamate | M.P. | 120 – 122°C |
| O-methyl-N-[3-(N'-phenylcarbamoyloxy)-phenyl]-thiocarbamate | | resinous |
| O-Methyl-N-[3-(N'-2'-methylphenyl-carbamoyloxy)-phenyl]-thiocarbamate | | resinous |
| O-Methyl-N-[3-(N'-4'-methylphenyl-carbamoyloxy)-phenyl]-thiocarbamate | | resinous |
| O-Methyl-N-[3-(N'-3'-methylphenyl-carbamoyloxy)-phenyl]-thiocarbamate | | resinous |
| O-Methyl-N-[3-(N'-methylcarbamoyloxy)-phenyl]-thiocarbamate | M.P. | 115 – 116°C |
| O-Methyl-N-[3-(N'-ethylcarbamoyloxy)-phenyl]-thiocarbamate | M.P. | 107 – 108°C |
| O-Methyl-N-[3-(N'-tert-butylcarbamoyloxy)-phenyl]-thiocarbamate | M.P. | 113 – 114°C |
| O-Ethyl-N-[3-(N'-phenyl-carbamoyloxy)-phenyl]-thiocarbamate | M.P. | 127.5 – 128.5°C |
| O-Methyl-N-[3-(N'-cyclohexylcarbamoyloxy)-phenyl]-thiocarbamate | M.P. | 110 – 112°C |
| O-Methyl-N-[3-(N'-3'-chlorophenyl-carbamoyloxy)-phenyl]-thiocarbamate | M.P. | 116 – 118°C |
| O-Methyl-N-[3-(N'-4'-chlorophenyl-carbamoyloxy)-phenyl]-thiocarbamate | M.P. | 157°C |
| O-Methyl-N-[3-(N'-n-hexylcarbamoyloxy)-phenyl]-thiocarbamate | | resinous |
| Methyl-N-[3-(N'-4'-chloro-2'-trifluoromethylphenyl-carbamoyloxy)-phenyl]-carbamate | M.P. | 90 – 92°C |
| O-Methyl-N-[3-(N'-2'-ethyl-n-hexyl-carbamoyloxy)-phenyl]-thiocarbamate | $n_D^{20}$ | 1.5625 |

Table II —Continued

| | | |
|---|---|---|
| Methyl-N-[3-(N'-1'-hydroxybutyl-2'-carbamoyloxy)-phenyl]-carbamate | M.P. | 114 – 116°C |
| Methyl-N-[3-(N'-1'-chlorobutyl-2'-carbamoyloxy)-phenyl]-carbamate | M.P. | 143 – 144°C |
| Methyl-N-[3-(N'-2'-bromoethyl-carbamoyloxy)-phenyl]-carbamate | M.P. | 153 – 154°C |
| Methyl-N-[3-(N'-3'-methylbutyl-2-carbamoyloxy)-phenyl]-carbamate | M.P. | 140 – 141°C |
| Methyl-N-[3-(N'-3'-methylbutyl-carbamoyloxy)-phenyl]-carbamate | M.P. | 119 – 121.5°C |
| Methyl-N-[3-(N'-2'-methylbutyl-carbamoyloxy)-phenyl]-carbamate | M.P. | 111 – 112.5°C |
| Methyl-N-[3-(N'-2'-phenylethyl-carbamoyloxy)-phenyl]-carbamate | M.P. | 114 – 115.5°C |
| Methyl-N-[3-(N'-1'-phenylethyl-carbamoyloxy)-phenyl]-carbamate | M.P. | 153 – 155°C |
| Methyl-N-[3-(N'-3'-methyl-carbamoyloxy)-phenyl]-carbamate | M.P. | 133 – 136°C |
| O-Methyl-N-[3-(N'-4'-ethylphenyl-carbamoyloxy)-phenyl]-thiocarbamate | M.P. | 105 – 108°C |
| O-Methyl-N-[3-(N'-3'-trifluoromethylphenyl-carbamoyloxy)-phenyl]-thiocarbamate | M.P. | 127°C |
| O-Methyl-N-[3-(N'-sec. butylcarbamoyloxy)-phenyl]-thiocarbamate | M.P. | 99 – 100°C |
| O-Methyl-N-[3-N'-β-chloroethyl-carbamoyloxy)-phenyl]-thiocarbamate | M.P. | 87 – 89°C |
| S-Methyl-N-[3-(N'-methyl-N'-4'-ethylphenyl-carbamoyloxy)-phenyl]-thiocarbamate | M.P. | 104 – 108°C |
| S-Methyl-N-[3-(N'-ethyl-N'-phenylcarbamoyloxy)-phenyl]-thiocarbamate | M.P. | 158 – 159°C |
| S-Methyl-N-[3-(N'-ethyl-N'-3'-methylphenyl-carbamoyloxy)-phenyl]-thiocarbamate | M.P. | 100 – 101°C |
| S-Methyl-N-[3-(N'-ethyl-N'-2'-methylphenyl-carbamoyloxy)-phenyl]-thiocarbamate | M.P. | 114 – 116°C |
| S-Methyl-N-[3-(N'-isopropyl-N'-phenylcarbamoyloxy)-phenyl]-thiocarbamate | M.P. | 148 – 149°C |
| S-Methyl-N-[3-(N'-methyl-N'-3'-methylphenyl-carbamoyloxy)-phenyl]-thiocarbamate | $n_D^{20}$ | 1.5810 |

Additional herbicidal carbamates which may be combined with the compounds of formula (I) to enhance the herbicidal effects of the latter have been disclosed in the German Published Patent Application No. 1,567,151 and the French Pat. No.1,498,834.

The afore-mentioned secondary carbamates have herbicidal effects of their own, but the synergistic effect referred to above is only achieved in mixtures with compounds of formula (I).

The following Examples illustrate the herbicidal effects of compounds of the invention and of known compounds employed as controls.

EXAMPLE 5

The plants listed in Table III were treated in the hothouse with compounds of the invention prior to emergence (a) and after emergence (b). The active agents of the invention were applied at a dosage of 5 kg per hectare in the form of aqueous emulsions which were sprayed at a rate of 500 liters per hectare. The control compound was applied in the same manner.

The results achieved were evaluated after three weeks according to a scale on which 0 indicates no effect and 4 indicates total destruction. The test results listed in Table III show the superiority of the compounds of the invention.

Table III

| | Mustard | | Tomato | |
|---|---|---|---|---|
| | a | b | a | b |
| Methyl-N-acetyl-N-[3-(N'-acetyl-N'-ethylcarbamoyloxy)-phenyl]-carbamate | 4 | 4 | — | 4 |
| Methyl-N-acetyl-N-[3-(N'-acetyl-N'-n-propylcarbamoyloxy)-phenyl]-carbamate | 4 | 4 | — | 4 |
| Methyl-N-acetyl-N-[3-(N'-acetyl-N'-isopropylcarbamoyloxy)-phenyl]-carbamate | 4 | 4 | 3 | 4 |
| Methyl-N-acetyl-N-[3-(N'-acetyl-N'-n-butylcarbamoyloxy)-phenyl]-carbamate | 4 | 4 | — | 4 |
| S-Methyl-N-acetyl-N-[3-(N'-acetyl-N'-n-butylcarbamoyloxy)-phenyl]-thiocarbamate | 3 | 4 | 3 | 4 |
| S-Methyl-N-acetyl-N-[3-(N'-acetyl-N'-isobutylcarbamoyloxy)-phenyl]-thiocarbamate | 4 | 3 | 3 | 3 |
| S-Methyl-N-acetyl-N-[3-(N'-acetyl-N'-sec. butylcarbamoyloxy)-phenyl]-thiocarbamate | 4 | 4 | 4 | 4 |
| S-Methyl-N-acetyl-N-[3-(N'-acetyl-N'-neopentylcarbamoyloxy)-phenyl]-thiocarbamate | 4 | 4 | 4 | 4 |
| S-Methyl-N-acetyl-N-[3-(N'-acetyl-N'-allylcarbamoyloxy)-phenyl]-thiocarbamate | 3 | 4 | — | 3 |
| Methyl-N-propionyl-N-[3-(N'-methyl-N'-propionylcarbamoyloxy)-phenyl]-carbamate | 3 | — | — | 4 |
| Methyl-N-propionyl-N-[3-(N'-ethyl-N'-propionylcarbamoyloxy)-phenyl]-carbamate | 4 | — | 3 | 3 |
| Methyl-N-propionyl-N-[3-(N'-n-butyl-N'-propionylcarbamoyloxy)-phenyl]-carbamate | 4 | 4 | 4 | — |
| Methyl-N-propionyl-N-[3-(N'-isobutyl-N'-propionylcarbamoyloxy)-phenyl]-carbamate | 4 | 4 | — | — |
| Methyl-N-propionyl-N-[3-(N'-sec. butyl-N'-propionylcarbamoyloxy)-phenyl]-carbamate | 4 | 4 | 4 | 4 |
| Methyl-N-propionyl-N-[3-(N'-neopentyl-N'-propionylcarbamoyloxy)-phenyl]-carbamate | 4 | 3 | — | 3 |
| Methyl-N-propionyl-N-[3-(N'-3-methylbutyl-N'-propionylcarbamoyloxy)-phenyl]-carbamate | 4 | 4 | 4 | 4 |
| Methyl-N-propionyl-N-[3-(N'-cyclohexyl-N'-propionylcarbamoyloxy)-phenyl]-carbamate | 4 | 4 | 4 | 4 |
| Methyl-N-butyryl-N-[3-(N'-methyl-N'-butyrylcarbamoyloxy)-phenyl]-carbamate | 3 | 3 | — | 4 |
| Methyl-N-butyryl-N-[3-(N'-ethyl-N'-butyrylcarbamoyloxy)-phenyl]-carbamate | 4 | 4 | — | — |
| Methyl-N-butyryl-N-[3-(N'-propyl-N'-butyrylcarbamoyloxy)-phenyl]-carbamate | 4 | 4 | — | 4 |
| Methyl-N-butyryl-N-[3-(N'-n-butyl-N'-butyrylcarbamoyloxy)-phenyl]-carbamate | 4 | 4 | 3 | 3 |
| Methyl-N-butyryl-N-[3-(N'-isobutyl-N'-butyrylcarbamoyloxy)-phenyl]-carbamate | 4 | 4 | — | — |
| Methyl-N-butyryl-N-[3-(N'-neopentyl-N'-butyrylcarbamoyloxy)-phenyl]-carbamate | — | 4 | — | 4 |
| Methyl-N-butyryl-N-[3-(N'-cyclohexyl-N'-butyrylcarbamoyloxy)-phenyl]-carbamate | 4 | — | 4 | 4 |
| Methyl-N-isobutyryl-N-[3-(N'-methyl-N'-isobutyrylcarbamoyloxy)-phenyl]-carbamate | — | 3 | — | 4 |
| Methyl-N-isobutyryl-N-[3-(N'-ethyl-N'-isobutyrylcarbamoyloxy)-phenyl]-carbamate | — | 4 | — | 4 |
| Methyl-N-isobutyryl-N-[3-(N'-propyl-N'-isobutyrylcarbamoyloxy)-phenyl]-carbamate | 3 | 4 | 4 | 4 |
| Methyl-N-isobutyryl-N-[3-(N'-n-butyl-N'-isobutyrylcarbamoyloxy)-phenyl]-carbamate | 4 | 3 | — | 3 |
| Methyl-N-isobutyryl-N-[3-(N'-neopentyl-N'-isobutyrylcarbamoyloxy)-phenyl]-carbamate | 4 | 4 | — | 3 |
| Methyl-N-isobutyryl-N-[3-(N'-allyl-N'-isobutyrylcarbamoyloxy)-phenyl]-carbamate | — | 4 | — | 4 |
| Methyl-N-capryl-N-[3-(N'-methyl-N'-caprylcarbamoyloxy)-phenyl]-carbamate | — | 3 | — | 3 |
| Methyl-N-bromacetyl-N-[3-(N'-n-butyl-N'-bromacetylcarbamoyloxy)-phenyl]-carbamate | 3 | — | — | 3 |
| Methyl-N-acetyl-N-[3-(N'-phenyl-N'-acetylcarbamoyloxy)-phenyl]-carbamate | — | 4 | — | 4 |
| Methyl-N-acetyl-N-[3-(N'-3'-methylphenyl-N'-acetylcarbamoyloxy)-phenyl]-carbamate | — | 4 | — | 4 |
| Ethyl-N-acetyl-N-[3-(N'-3'-methylphenyl-N'-acetylcarbamoyloxy)-phenyl]-carbamate | — | 4 | — | 4 |
| Methyl-N-acetyl-N-[3-(N'-,N'-diethylcarbamoyloxy)-phenyl]-carbamate | — | 4 | — | 4 |
| Methyl-N-acetyl-N-[3-(N'-tert-butylcarbamoyloxy)-phenyl]-carbamate | 4 | 4 | 4 | 4 |
| Methyl-N-acetyl-N-[3-(N'-methyl-N'-phenylcarbamoyloxy)-phenyl]-carbamate | 4 | 4 | 4 | 4 |
| Methyl-N-[3-(N'-acetyl-N'-n-butylcarbamoyloxy)-phenyl]-carbamate | 4 | 4 | 4 | 4 |
| Methyl-N-acetyl-N-[3-(N'-acetyl-N'-2'-methylphenyl-carbamoyloxy)-phenyl]-carbamate | — | 4 | — | 4 |

Table III —Continued

| | Mustard a | Mustard b | Tomato a | Tomato b |
|---|---|---|---|---|
| Methyl-N-propionyl-N-[3-(N'-propionyl-N'-4'-methylphenyl-carbamoyloxy)-phenyl]-carbamate | — | 4 | — | 4 |
| Methyl-N-propionyl-N-[3-(N'-propionyl-N'-3'-chlorophenyl)-carbamoyloxy)-phenyl]-carbamate | — | 4 | — | 4 |
| Methyl-N-[3-(N'-acetyl-N'-phenylcarbamoyloxy)-phenyl]-carbamate | 4 | 4 | — | 4 |
| Methyl-N-[3-(N'-acetyl-N'-3'-methylphenyl-carbamoyloxy)-phenyl]-carbamate | — | 4 | — | 4 |
| S-Methyl-N-[3-(N'-acetyl-N'-phenylcarbamoyloxy)-phenyl]-thiocarbamate | — | 4 | — | 4 |
| S-Methyl-N-[3-(N'-acetyl-N'-3'-methylphenyl-carbamoyloxy)-phenyl]-thiocarbamate | — | 4 | — | 4 |
| Methyl-N-acetyl-N-[3-(N'-acetyl-N'-3'-chlorophenyl-carbamoyloxy)-phenyl]-carbamate | — | 4 | — | 4 |
| Methyl-N-isobutyryl-N-[3-(N'-isobutyryl-N'-n-butylcarbamoyloxy)-phenyl]-carbamate | 0 | 1 | 0 | 2 |
| O-Methyl-acetyl-N-[3-(N'-acetyl-N'-3'-methylphenyl-carbamoyloxy)-phenyl]-thiocarbamate | 0 | 4 | 0 | 4 |
| Methyl-N-propionyl-N-[3-(N'-propionyl-N'-2'-methylphenyl-carbamoyloxy)-phenyl]-carbamate | 0 | 3 | 0 | 3 |
| Methyl-N-acetyl-N-[3-(N'-acetyl-N'-3'-methylbutyl-carbamoyloxy)-phenyl]-carbamate | 4 | 4 | 3 | 4 |
| Methyl-N-isobutyryl-N-[3-(N'-isobutyryl-N'-4'-methylphenyl-carbamoyloxy)-phenyl]-carbamate | 0 | 3 | 0 | 4 |
| Methyl-N-acetyl-N-[3-(N'-acetyl-N'-2'-phenylethyl)-carbamoyloxy)-phenyl]-carbamate | 4 | 4 | 1 | 4 |
| Methyl-N-acetyl-N-[3-(N'-acetyl-N'-methylcarbamoyloxy)-phenyl]-carbamate | 1 | 4 | 1 | 4 |
| Methyl-N-butyryl-N-[3-(N'-butyryl-N'-sec.butylcarbamoyloxy)-phenyl]-carbamate | 4 | 4 | 1 | 4 |
| Methyl-N-propionyl-N-[3-(N'-propionyl-N'-allylcarbamoyloxy)-phenyl]-carbamate | 4 | 4 | 1 | 4 |
| Methyl-N-acetyl-N-[3-(N'-acetyl-N'-cyclohexylcarbamoyloxy)-phenyl]-carbamate | 4 | 4 | 3 | 4 |
| Methyl-N-acetyl-N-[3-(N'-acetyl-N'-4'-methylpentyl-2-carbamoyloxy)-phenyl]-carbamate | 4 | 4 | 4 | 4 |
| Methyl-N-[3-(N'-acetyl-N'-n-propylcarbamoyloxy)-phenyl]-carbamate | 4 | 4 | 4 | 4 |
| Methyl-N-[3-(N'-acetyl-N'-allylcarbamoyloxy)-phenyl]-carbamate | 3 | 4 | — | 4 |
| Methyl-N-[3-(N'-acetyl-N'-neopentylcarbamoyloxy)-phenyl]-carbamate | 4 | 4 | 4 | 4 |
| Methyl-N-[3-(N'-acetyl-N'-4'-methylpentyl-2'-carbamoyloxy)-phenyl]-carbamate | 4 | 4 | 4 | 4 |
| Methyl-N-[3-(N'-acetyl-N'-pentylcarbamoyloxy)-phenyl]-carbamate | 4 | 4 | 4 | 4 |
| Methyl-N-[3-(N'-acetyl-N'-2'-methylbutyl-carbamoyloxy)-phenyl]-carbamate | 4 | 4 | 4 | 4 |
| Methyl-N-[3-(N'-propionyl-N'-n-propylcarbamoyloxy)-phenyl]-carbamate | 4 | 4 | 2 | 4 |
| Methyl-N-α-bromopropionyl-N-[3-(N'-α-bromopropionyl-N'-n-butylcarbamoyloxy)-phenyl]-carbamate | 4 | 4 | 4 | 4 |
| Methyl-N-acetyl-N-[3-(N'-acetyl-N'-4'-methylphenyl-carbamoyloxy)-phenyl]-carbamate | — | 4 | — | 4 |
| S-Methyl-N-[3-(N'-acetyl-N'-n-butylcarbamoyloxy)-phenyl]-thiocarbamate | — | 4 | — | 4 |
| Control: Isopropyl-N-(3-chlorophenyl)-carbamate | 1 | 0 | 1 | 4 |

EXAMPLE 6

In a hothouse, crop plants and weeds were treated prior to emergence with the active agents listed in Table IV at a rate of 1 kg per hectare. The compounds of the invention and a control were compounded as emulsions of which 500 liter were used per hectare.

Three weeks after treatment, the results were evaluated according to a scale on which 0 indicates total destruction while 10 indicates no damage. As is evident from the following Table IV, the crop plants were either not damaged at all or only to an insignificant extent. The weeds, however, were destroyed or severely damaged by the compounds of the invention, while the control did not show significant selectivity.

Table IV

| | Corn | Rice | Avena fatua | Alopecurus | Echinochloa | Setaria italica | Digitaria | Cynodon |
|---|---|---|---|---|---|---|---|---|
| Methyl-N-acetyl-N-[3-(N'-tert-butyl-carbamoyloxy)-phenyl]-carbamate | 10 | 10 | 1 | 1 | — | 0 | 0 | — |
| Methyl-N-acetyl-N-[3-(N'-acetyl-N'-Neopentylcarbamoyloxy)-phenyl]-carbamate | 10 | 10 | 0 | 0 | 0 | 0 | 0 | — |
| Methyl-N-acetyl-N-[3-(N'-acetyl-N'-sec. butylcarbamoyloxy)-phenyl]-carbamate | 10 | 10 | 0 | 0 | 0 | — | 0 | 1 |
| Methyl-N-acetyl-N-[3-(N'-acetyl-N'-isobutylcarbamoyloxy)-phenyl]-carbamate | 10 | 8 | 0 | 1 | 0 | 3 | 1 | — |
| Methyl-N-acetyl-N-[3-(N'-acetyl-N'-n-butylcarbamoyloxy)-phenyl]-carbamate | 10 | 10 | 3 | 3 | 1 | 1 | 1 | — |
| Methyl-N-acetyl-N-[3-(N'-acetyl-N'-isopropylcarbamoyloxy)-phenyl]-carbamate | 10 | 10 | 3 | 3 | 1 | 0 | 0 | — |
| Methyl-N-[3-(N'-acetyl-N'-n-butyl-carbamoyloxy)-phenyl]-carbamate | 10 | 10 | 3 | 3 | 0 | 0 | 0 | — |
| Control: Methyl-N-[3-(N'-methyl-N'-phenylcarbamoyloxy)-phenyl]-carbamate | 8 | 8 | 8 | 8 | 5 | 4 | 6 | 10 |

EXAMPLE 7

Five compounds of the invention and a control were applied by spraying after emergence to the plants listed in Table v at a rate of 1 kg in 500 liter aqueous emulsion per hectare. The results achieved were evaluated after 18 days on the scale of Table IV. While equally effective against the weeds, the compounds of the invention were much better tolerated by the crop plants than the control.

Table V

| | Carrot | Stellaria Media | Senecio vulgaris | Matricaria chamomilla | Lamium amplexicaule | Centaurea cyanus | Amarantus retroflexus | Chrysanthemum segetum | Ipomea Purpurea |
|---|---|---|---|---|---|---|---|---|---|
| Methyl-N-propionyl-N-[3-(N'-propionyl-N'-3'-methylbutyl-carbamoyloxy)-phenyl]-carbamate | 10 | 0 | 1 | 1 | 0 | 0 | 3 | 0 | — |
| Methyl-N-propionyl-N-[3-(N'-propionyl-N'-cyclohexylcarbamoyloxy)-phenyl]-carbamate | 10 | 0 | 0 | 0 | 0 | 0 | 0 | 0 | 3 |
| Methyl-N-propionyl-N-[3-(N'-propionyl-N'-sec butylcarbamoyloxy)-phenyl]-carbamate | 10 | 0 | 0 | 0 | 0 | 2 | 0 | 0 | 0 |
| Methyl-N-[3-(N'-acetyl-N'-n-butylcarbamoyloxy)-phenyl]-carbamate | 10 | 0 | 0 | 0 | 0 | 0 | 0 | 0 | 1 |
| Methyl-N-acetyl-N-[3-(N'-acetyl-N'-n-butylcarbamoyloxy)-phenyl]-carbamate | 10 | 0 | 0 | 0 | 0 | 0 | 0 | 0 | 1 |
| Control: Methyl-N-(3-[N'-(3'-methylphenyl)-carbamoyloxy)-phenyl]-carbamate | 2 | 0 | 0 | 1 | 0 | 0 | 8 | 0 | 1 |

EXAMLE 8

In a hothouse test, sugar beets and weeds listed in Table VI were treated with each of four compositions at a dosage of 1.0 kg active substance per hectare in the form of aqueous emulsions of 500 liter per hectare. The compositions respectively contained a compound of formula (I), a compound of formula (II), and two mixtures of the two compounds in different proportions. The results were evaluated two weeks after the treatment, and the mixtures show significantly stronger effects on the weeds than the individual compounds. The sugar beets were unaffected by the mixtures as well as the individual compounds as is seen in Table VI which employs the scale of Example 6.

What is claimed is:

1. Herbicidal compounds having the formula

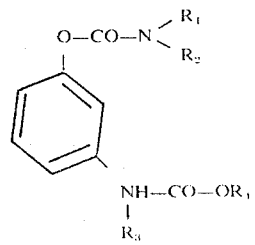

wherein $R_1$ can be hydrogen, an alkanoyl radical of from 1 to 6 carbons, alkyl of from 2 to 5 carbons, or cyclohexyl; $R_2$ can be hydrogen, alkyl of from 2 to 8 carbons, phenyl, chlorophenyl, methylphenyl, or ethylphenyl; $R_3$ is an alkanoyl radical of from 1 to 6 carbons; and $R_4$ is methyl or ethyl.

2. A compound according to claim 1 which is methyl-N-acetyl-N-[3-(N'-acetyl-ethylcarbamoyloxy]-phenyl-carbamate.

3. A compound according to claim 1 which is methyl-N-acetyl-N-[3-(N'-acetyl-N'-n-propylcarbamoyloxy)-phenyl]-carbamate.

4. A compound according to claim 1 which is methyl-N-acetyl-N-[3-(N'-acetyl-N'-isopropylcarbamoyloxy)-phenyl]-carbamate.

Table VI

| | Sugar beets | Stellaria media | Senecio vulgaris | Lamium amplexicavle | Centaurea cyanus | Amarantus retroflexus | Galium aparine | Chrysanthemum segetum | Ipomea purpurea | Avena fatua | Alopecurus myosuroides | Echinochloa crus galli | Setaria italica | Digitaria sanguinalis |
|---|---|---|---|---|---|---|---|---|---|---|---|---|---|---|
| Methyl-N-acetyl-N-[3-(N'-acetyl-N'-3'-methylphenyl-carbamoyloxy)-phenyl]-carbamate (I) | 10 | 2 | 0 | 1 | 3 | 10 | 9 | 2 | 3 | 8 | 8 | 5 | 3 | 5 |
| Methyl-N-[3-(N'-3'-methylphenyl-carbamoyloxy)-phenyl]-carbamate (II) | 9 | 2 | 0 | 0 | 2 | 10 | 7 | 0 | 3 | 8 | 8 | 5 | 3 | 5 |
| I + II 4 : 1 | 10 | 0 | 0 | 0 | 0 | 5 | 4 | 0 | 0 | 4 | 4 | 0 | 0 | 2 |
| I + II 8 : 1 | 10 | 0 | 0 | 0 | 0 | 4 | 3 | 0 | 0 | 5 | 5 | 0 | 0 | 2 |

5. A compound according to claim 1 which is methyl-N-acetyl-N-[3-(N'-acetyl-N'-n-butylcarbamoyloxy)-phenyl]-carbamate.

6. A compound according to claim 1 which is methyl-N-propionyl-N-[3-(N'-ethyl-N'-propionylcarbamoyloxy)-phenyl]-carbamate.

7. A compound according to claim 1 which is methyl-N-propionyl-N-[3-(N'-n-butyl-N'-propionylcarbamoyloxy)-phenyl]-carbamate.

8. A compound according to claim 1 which is methyl-N-propionyl-N-[3-(N'-isobutyl-N'-propionylcarbamoyloxy)-phenyl]-carbamate.

9. A compound according to claim 1 which is methyl-N-propionyl-N-[3-(N'-sec.butyl-N'-propionylcarbamoyloxy)-phenyl]-carbamate.

10. A compound according to claim 1 which is methyl-N-propionyl-N-[3-(N'-neopentyl-N'-propionylcarbamoyloxy)-phenyl]-carbamate.

11. A compound according to claim 1 which is methyl-N-propionyl-N-[3-(N'-3'-methylbutyl-N'-propionylcarbamoyloxy)-phenyl]-carbamate.

12. A compound according to claim 1 which is methyl-N-propionyl-N-[3-(N'-cyclohexyl-N'-propionylcarbamoyloxy)-phenyl]-carbamate.

13. A compound according to claim 1 which is methyl-N-butyryl-N-[3-(N'-methyl-N'-butyrylcarbamoyloxy)-phenyl]-carbamate.

14. A compound according to claim 1 which is methyl-N-butyryl-N-[3-(N'-ethyl-N'-butyrylcarbamoyloxy)-phenyl]-carbamate.

15. A compound according to claim 1 which is methyl-N-butyryl-N-[3-(N'-propyl-N'-butyrylcarbamoyloxy)-phenyl]-carbamate.

16. A compound according to claim 1 which is methyl-N-butyryl-N-[3-(N'-n-butyl-N'-butyrylcarbamoyloxy)-phenyl]-carbamate.

17. A compound according to claim 1 which is methyl-N-butyryl-N-[3-(N'-isobutyl-N'-butyrylcarbamoyloxy)-phenyl]-carbamate.

18. A compound according to claim 1 which is methyl-N-butyryl-N-[3-(N'-neopentyl-N'-butyrylcarbamoyloxy)-phenyl]-carbamate.

19. A compound according to claim 1 which is methyl-N-butyryl-N-[3-(N'-cyclohexyl-N'-butyrylcarbamoyloxy)-phenyl]-carbamate.

20. A compound according to claim 1 which is methyl-N-isobutyryl-N-[3-(N'-methyl-N'-isobutyrylcarbamoyloxy)-phenyl]-carbamate.

21. A compound according to claim 1 which is methyl-N-isobutyryl-N-[3-(N'-ethyl-N'-isobutyrylcarbamoyloxy)-phenyl]-carbamate.

22. A compound according to claim 1 which is methyl-N-isobutyryl-N-[3-(N'-propyl-N'-isobutyrylcarbamoyloxy)-phenyl]-carbamate.

23. A compound according to claim 1 which is methyl-N-isobutyryl-N-[3-(N'-n-butyl-N'-isobutyrylcarbamoyloxy)-phenyl]-carbamate.

24. A compound according to claim 1 which is methyl-N-isobutyryl-N-[3-(N'-neopentyl-N'-isobutyrylcarbamoyloxy)-phenyl]-carbamate.

25. A compound according to claim 1 which is methyl-N-isobutyryl-N-[3-(N'-allyl-N'-isobutyrylcarbamoyloxy)-phenyl]-carbamate.

26. A compound according to claim 1 which is methyl-N-acetyl-N-[3-(N'-phenyl-N'-acetylcarbamoyloxy)-phenyl]-carbamate.

27. A compound according to claim 1 which is methyl-N-acetyl-N-[3-(N'-3'-methylphenyl-N'-acetylcarbamoyloxy)-phenyl]-carbamate.

28. A compound according to claim 1 which is ethyl-N-acetyl-N-[3-(N'-3'-methylphenyl-N'-acetylcarbamoyloxy)-phenyl]-carbamate.

29. A compound according to claim 1 which is methyl-N-acetyl-N-[3-(N',N'-diethylcarbamoyloxy)-phenyl]-carbamate.

30. A compound according to claim 1 which is methyl-N-acetyl-N-[3-(N'-tert-butylcarbamoyloxy)-phenyl]-carbamate.

31. A compound according to claim 1 which is methyl-N-acetyl-N-[3-(N'-methyl-N'-phenylcarbamoyloxy)-phenyl]-carbamate.

32. A compound according to claim 1 which is methyl-N-[3-(N'-acetyl-N'-n-butylcarbamoyloxy)-phenyl]-carbamate.

33. A compound according to claim 1 which is methyl-N-acetyl-N-[3-(N'-acetyl-N'-2'-methylphenylcarbamoyloxy)-phenyl]-carbamate.

34. A compound according to claim 1 which is methyl-N-propionyl-N-[3-(N'-propionyl-N'-4'-methylphenyl-carbamoyloxy)-phenyl]-carbamate.

35. A compound according to claim 1 which is methyl-N-propionyl-N-[3-(N'-propionyl-N'-3'-chlorophenyl-carbamoyloxy)-phenyl]-carbamate.

36. A compound according to claim 1 which is methyl-N-[3-(N'-acetyl-N'-phenylcarbamoyloxy)-phenyl]-carbamate.

37. A compound according to claim 1 which is methyl-N-[3-(N'-acetyl-N'-3'-methylphenyl-carbamoyloxy)-phenyl]-carbamate.

38. A compound according to claim 1 which is methyl-N-acetyl-N-[3-(N'-acetyl-N'-3'-chlorophenyl-carbamoyloxy)-phenyl]-carbamate.

39. A compound according to claim 1 which is methyl-N-acetyl-N-[3-(N'-acetyl-N'-4'-methylphenyl-carbamoyloxy)-phenyl]-carbamate 40. A compound according to claim 1 which is methyl-N-acetyl-N-[3-(N'-acetyl-N'-2'-phenylethyl-carbamoyloxy)-phenyl]-carbamate.

41. A compound according to claim 1 which is methyl-N-isobutyryl-N-[3-(N'-isobutyryl-N'-n-butylcarbamoyloxy)-pheny]-carbamate.

* * * * *